United States Patent [19]

Itani

[11] 4,302,787
[45] Nov. 24, 1981

[54] TAPE CASSETTE AND VIDEO RECORDING AND REPRODUCING SYSTEM USING THE SAME

[75] Inventor: Takashi Itani, Yokohama, Japan

[73] Assignee: Canon Kabushiki Kaisha, Tokyo, Japan

[21] Appl. No.: 91,171

[22] Filed: Nov. 5, 1979

[30] Foreign Application Priority Data

Nov. 8, 1978 [JP] Japan ................................ 53-137722

[51] Int. Cl.³ .......................... G11B 5/52; G11B 23/08
[52] U.S. Cl. ...................................... 360/85; 242/199; 360/132
[58] Field of Search ....................... 360/85, 84, 93, 95, 360/132, 96.1–96.2; 242/197–200

[56] References Cited

U.S. PATENT DOCUMENTS

| | | | |
|---|---|---|---|
| 3,213,204 | 10/1965 | Okamura | 360/84 |
| 3,352,976 | 11/1967 | Gonmori | 360/96.3 |
| 3,463,878 | 8/1969 | Nassimbene | 360/84 |
| 3,643,038 | 2/1972 | Sato | 360/85 |
| 3,665,114 | 5/1972 | Hathaway | 360/85 |
| 3,674,942 | 7/1972 | Sugaya | 360/85 |
| 4,017,897 | 4/1977 | Blanding | 360/85 |
| 4,139,873 | 2/1979 | Maxey | 360/85 |

FOREIGN PATENT DOCUMENTS 442511 4/1975 U.S.S.R. ................................ 360/84

*Primary Examiner*—Alfred H. Eddleman
*Attorney, Agent, or Firm*—Toren, McGeady and Stanger

[57] ABSTRACT

A tape cassette and a video recording and reproducing system using the same are disclosed. This system provides an increase in the recording capacity of video signals despite the reduction of volume of a tape within the cassette and the resultant reduction in the bulk and size of the cassette and can be loaded with the tape cassette on selection of two conditions. The tape cassette will be turned upside down after the video signals have been recorded on either one of the upper and lower halves of the width of the tape.

8 Claims, 6 Drawing Figures

TAPE CASSETTE AND VIDEO RECORDING AND REPRODUCING SYSTEM USING THE SAME

BACKGROUND OF THE INVENTION

1. Field of the Invention

This invention relates to tape cassettes and video recording and reproducing systems using the same.

2. Description of the Prior Art

Development of a video recording and reproducing system comprising in combination a cassette type video tape and a VTR apparatus (Video Tape Recording Apparatus) has been recently particularly intense, and today such systems find wide acceptance in private homes. In the background of this development, we can get a glance into the efforts of the industry to achieve a great increase in the recording capacity for the video signals while still maintaining the bulk and size of the system and particularly the VTR apparatus at a minimum. Since, particularly in the case of the cassette type VTR apparatus, its dimensions largely depend upon the size of the tape cassette used therein, the larger the size of the tape cassette, the larger is the size of the VTR apparatus using such cassette. Further, since, therefore, the tape cassette could not be increased in size much more, the amount of tape accommodated in the cassette was necessarily limited which hindered increasing the recording capacity of video signals. Such drawback has, however, been overcome to some extent by reducing the thickness of magnetic tape due to the recent advance in the magnetic technology and by increasing the recording density by employing the guard bandless-azimuth recording method which is made possible by the improvement in the performance of magnetic material for the tape. As a result, the size of the tape cassette is reduced, and, therefore, the bulk and size of the VTR apparatus also is reduced, while nevertheless permitting the recording capacity of the video signals to be increased (elongation of picture recording time).

Of the video recording and reproducing systems of this character, there is a portable VTR system comprising, in combination, a portable TV (Television) camera and a portable VTR apparatus. Since this portable system has much importance particularly to the convenience in carrying, there is a stronger demand for further reducing the bulk and size of the VTR apparatus, and, therefore, there is also a stronger demand for reducing the size of the tape cassette. On the other hand, as has been mentioned above, although it is said that it is made possible to achieve a reduction in the size of the tape cassette by employing the thinner magnetic tape and the guard bandless-azimuth recording method, with the consideration of it as applied particularly to the portable system of the character described above in mind, the presently available tape cassette is still much too large and such circumstance makes it difficult to achieve a desired reduction in the bulk and size of the portable VTR apparatus. That is, if the emphasis is laid only on the reduction of the size of the VTR apparatus, it will be achieved by reducing the size of the tape cassette. This leads, however, to reduce the amount of tape accommodated in the cassette, thereby giving an alternate drawback that the total capacity of recording video signals is largely reduced.

Again, aside from the foregoing, although it is said that the increase in the video signal recording capacity is made possible by the reduction of the thickness of the magnetic tape and by the use of the guard bandless-azimuth recording method despite the reduction of the size of the cassette, as has been mentioned above, this trend of reducing the size of the tape cassette and of increasing the recording capacity is necessarily limited, and therefore, there remains room for so much improvement as desired with respect to a further minimization of the size of the tape cassette and a further increase in the recording capacity.

SUMMARY OF THE INVENTION

With the foregoing in mind, it is an object of the present invention to provide a more improved tape cassette and a video recording and reproducing system using the same which either make it possible to reduce the amount of tape accommodated in the cassette, and therefore further reduce the size of the tape cassette without causing a disadvantage that the capacity of recording video signals is reduced to much more, or enables easily a further increase in the video signal recording capacity without causing a disadvantage that the amount of tape accommodated in the cassette is increased so much more and therefore that the size of the tape cassette is increased.

To achieve this, according to the present invention, provision is made for making it possible to load the tape cassette in normal and upside down conditions selectively, thereby the video signals are recorded on either of the two tracks in the upper and lower halves of the width of the tape.

In more detail, as applied, for example, to the helical scan type VTR apparatus known in the art, let us assume that the effective width of recording the video signals for one field or one frame by the recording head of said VTR apparatus is taken at about $\frac{1}{2}$ inch according to the prior art, a magnetic tape of about 1 inch width is selected for employment in the tape cassette so that the video signals are to be recorded by the above-described recording head on either of the upper and lower halves of the width of the tape. Alternately assume that the width of the tape accommodated in the tape cassette remains unchanged from the conventional value of $\frac{1}{2}$ inch, the effective recording width of the video signals for one field or one frame by the recording head of the VTR apparatus is reduced to about $\frac{1}{2}$ of the conventional width, that is, to about $\frac{1}{4}$ inch, so that the upper and lower halves of the width of the tape can each record the video signals.

In this connection, it should be explained that the above-described tape cassette when particularly adapted to be used in a VTR apparatus of the type having an automatic tape loading mechanism, is provided in addition to the aperture for tape pull-out, with a cut-out portion formed in the front size of the tape cassette housing and arranged upon loading to freely receive the tape pulling-out means of the abovedescribed automatic tape loading mechanism, regardless of whether the tape cassette takes the first or normal loaded condition, or the second or upside down loaded condition.

Another feature of the present invention is that according to a preferred embodiment thereof to be described later, in order to facilitate a minimization of the size of the system and particularly the tape cassette, the capstan constituting part of a tape drive mechanism in the VTR apparatus is arranged to enter the cassette housing at a location on either side of the housing, as the tape cassette is provided with two cut-out portions on the right and left sides of the cassette housing in symmetric relation to accommodate the capstan regardless of whether the tape cassette is seated in the above-described first, or second loaded conditions.

Further, in the embodiment of the invention, a greater reduction of the size of the tape cassette is achieved by positioning its two tape reels in overlapped relation to each other.

Thus, according to the present invention, it is made possible to achieve a large decrease in the amount of tape accommodated, and, therefore, a further minimization of the size of the tape cassette without sacrificing the recording capacity of video signals, or a remarkable increase in the video signal recording capacity without sacrificing the minimization of the amount of tape accommodated in the cassette, and, therefore, without causing the size of the tape cassette to be unduly increased.

This and other objects and features of the present invention will become apparent from the following detailed description of an embodiment thereof taken in conjunction with the accompanying drawings.

DETAILED DESCRIPTION OF THE PREFERRED EMBODIMENT

Figure 1:
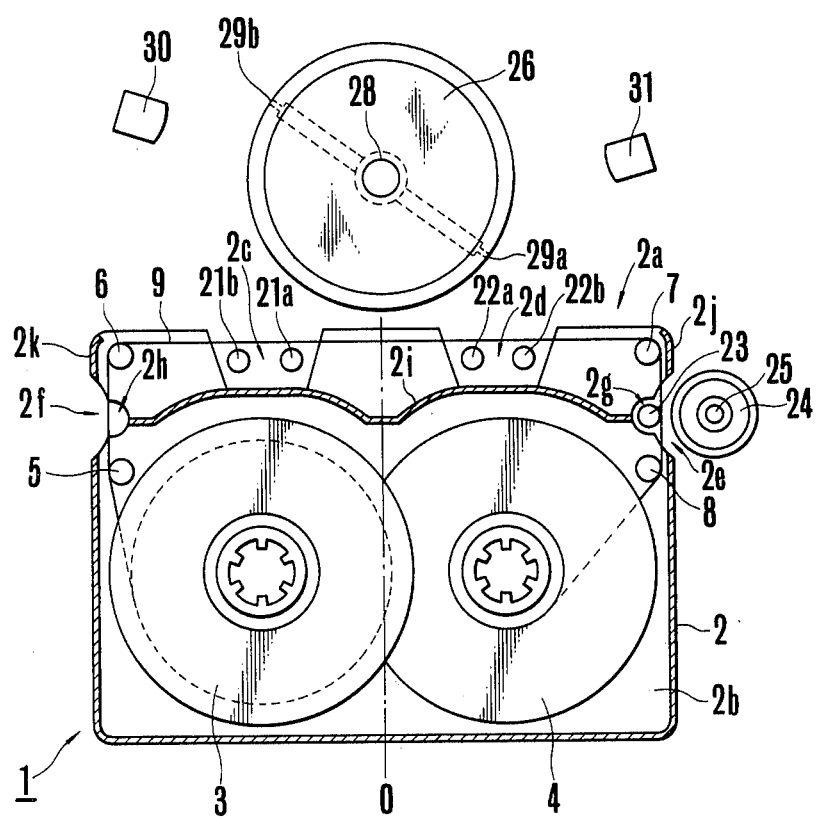
FIG. 1 is a schematic top view of the main parts of an embodiment of a tape cassette and a VTR apparatus according to the present invention in a position where the cassette is seated in the chamber but the tape is not loaded yet.
Figure 2:
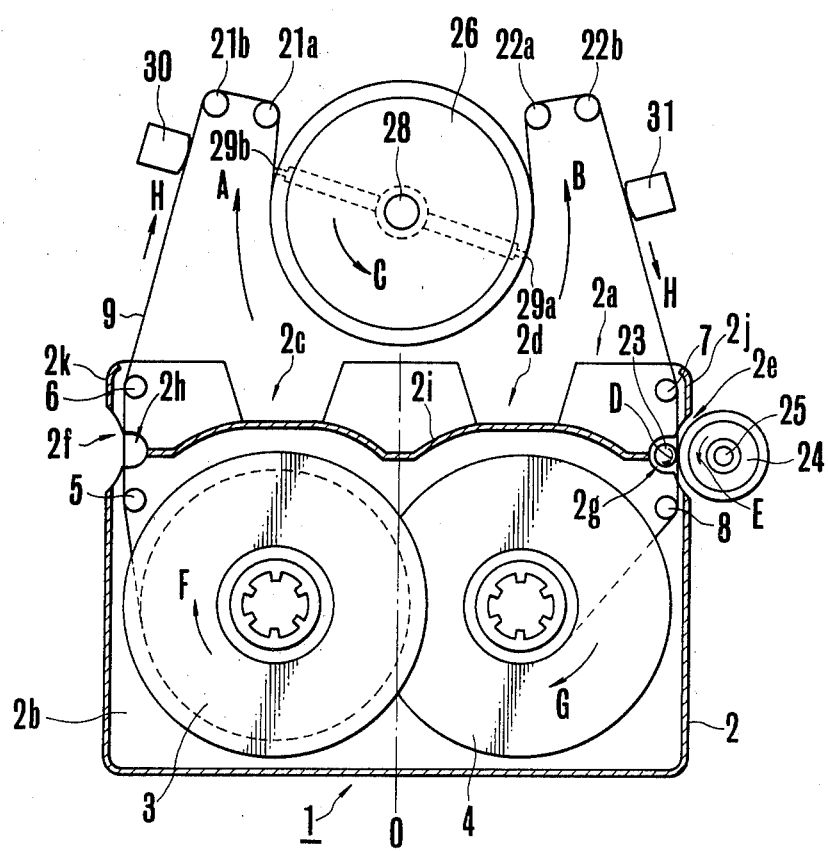
FIG. 2 is a similar view showing the tape in the loaded position where video signal recording or reproducing is performed.

In FIGS. 1 and 2 there is shown a tape cassette which is generally indicated at 1 with a housing thereof at 2. The cassette housing 2 contains a pair of tape reels 3 and 4 in partially overlapped relation to each other, in other words, as lying in different levels. A magnetic tape 9, while being guided by guide rollers 5, 6, 7 and 8 through a space between said reels 3 and 4, is caused to run from the reel 3 to the reel 4 and then from the reel 4 to the reel 3. The front panel of the cassette housing 2 has two apertures 2a from which the tape 9 is pulled out by a tape-auto-loading mechanism in the VTR apparatus, and the upper and lower panels of the housing (in the figure, the upper panel is taken away and only the lower panel is shown by 2b) are provided with cut-out portions 2c and 2d formed therein in contiguous relation to the apertures 2a and arranged to permit the tape pull-out means of the above-described tape-auto-loading mechanism in the form of pins 21a–21b and 22a–22b to enter respective spaces behind the tape path. It is noted here that these cut-out portions 2c and 2d are symmetrically formed with respect to a central line 0 so that even when the cassette 1 is turned upside down, that is, when the cassette is loaded with the lower housing panel 2b coming to lie upside, the above-described tape pull-out pins 21a–21b and 22a–22b are properly received in a similar manner to the above. Though not shown in the figures, it is of course natural that the upper panel of the housing 2 is provided with similar cut-out portions to those 2c and 2d. Further, the housing 2 is provided with apertures 2e and 2f formed in portions of the side panels thereof in symmetrical relation with respect to the central line 0 and arranged to allow for entrance of a pinch roller 24 constituting part of a tape drive mechanism in the VTR apparatus. Further, contiguous to said apertures 2e and 2f are cutouts 2g and 2h respectively formed in portions of each of the upper and lower panels of the housing 2 also in symmetric relation with respect to the central line 0 and arranged to allow for entrance of a capstan 23 as a drive shaft constituting part of the above-described tape drive mechanism. It is noted again that though illustration is given only to the cutouts 2g and 2h formed in the portions of the lower panel of the housing, similar cutouts to these illustrated ones are also formed in portions of the upper panel (not shown) of the housing 2. A front partition wall 2i is positioned in a space between the reels 3 and 4 and the tape path 9. The pinch roller 24 is mounted on a rotary shaft 25.

The VTR apparatus further includes a known tape guide rotary cylinder (upper cylinder), a stationary cylinder 27 (lower cylinder) for tape guide (see FIG. 3), a rotary shaft 28 on which the rotary cylinder 26 is fixedly mounted to be driven for rotation by known drive means (not shown), video signal recording and reproducing magnetic heads 29a and 29b spaced apart from each other by 180° and arranged to rotate along with the rotary cylinder 26, a half-width eraser magnetic head 30, and a recording and reproducing magnetic head 31 for audio signals and control signals. The above-described tape pull-out pins 21a–21b and 22a–22b are arranged to press the tape 9 against the above-described cylinders 26 and 27 and the magnetic heads 30 and 31 in a so-called "M" loading manner, as shown in FIG. 2. The details of such tape loading mechanism are well known to those skilled in the art, and therefore their illustration is omitted here.

Now, as will be described in greater detail, the magnetic heads 29a, 26b and 31 must be arranged relative to the path of the tape 9 to record the video signal, sound signal and control signal on either of the halves of the width of the tape 9. Also likewise as the above, the above-described eraser head 30 is arranged to erase the signals recorded in either of the halves of the width of the tape 9.

Figure 3:
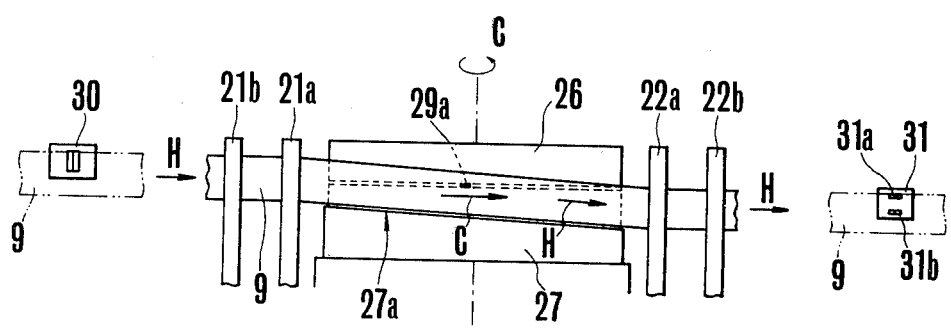
FIG. 3 is a side elevational view of the system of FIG. 2 with a rotary head of the VTR apparatus scanning the tape.

With such construction, now when the tape cassette 1 is inserted into and seated in a cassette chamber (not shown) in the VTR apparatus and then when a chamber cover (not shown) is closed, a cassette carrier (not shown) while holding the cassette 1 is concurrently moved downwards as is known in the art, whereby the tape pull-out pins 21a–21b and 22a–22b of the VTR apparatus and the capstan 23 enter the cassette housing 2 through the cut-out portions 2c, 2d and 2g respectively on the back side of the tape 9, with the resultant positions of these parts being shown in FIG. 1. Then, when a tape loading control means (not shown) is actuated, the above-described rotary cylinder 26, magnetic heads 29a and 29b and capstan 23 are driven by respective drive means (not shown) to rotate in directions indicated by arrows C and D respectively, and, at the same time, the above-described tape-auto-loading mechanism is actuated with the tape pull-out pins 21a–21b and 22a–22b moving around the cylinder assembly 26 and 27 in directions indicated by arrows A and B respectively to the illustrated positions of FIG. 2 (that is, the rear of the cylinders 26, 27), while the tape 9 is pulled out of the cassette 1 to be trained around the cylinders 26, 27 in a front almost half circumference (180°+α) thereof and also to be brought into contact with the eraser head 30 and the audio signal and control signal recording and reproducing head 31. Thus, the system is set in the tape 9 loading state shown in FIG. 2. Then, after this loading of the tape 9 has been completed, when a recording start means, or a play back start means (not shown) is actuated, a known pinch roller control mechanism (not shown) moves the pinch roller 24 from the position of FIG. 1 to the left until it enters the aperture 2e in the right side panel of the housing 2 to press the tape 9 against the capstan 23 (therefore, the pinch roller 24 starts to rotate in a direction indicated by arrow E of FIG. 2), and the tape reels 3 and 4 are driven by known drive means (not shown) to rotate in respective directions indicated by arrows F and G. Thus, the tape 9 is transported from the reel 3 through the head 30, cylinders 26, 27, head 31, capstan 23 and pinch roller 24 to the reel 4 thus moving in a direction indicated by arrow H, while the video signal and audio signal are either recorded, or reproduced. In connection with the latter, illustration is given in FIG. 3 where the rotary heads 29a and 29b scan the tape 9 on the outer circumference of the cylinders 26 and 27. In more detail, as the tape 9 is made slanted over about one half of the circumference of the cylinders 26 and 27 and is moved at a far slower speed than that of the cylinder 26, the heads 29a and 29b alternately scan the half of the width of the tape 9 obliquely. In FIG. 3 there are further shown a stepped-up portion 27a for adjusting the position of the tape 9 formed in the stationary cylinder 27, and audio signal and control signal recording and reproducing head elements 31a and 31b respectively positioned to scan the tape 9 in the upper and lower marginal portions of the upper half of the width of the tape 9 as the tape 9 is adjusted in position by known upper and lower position regulating means (not shown).

Now, here, as has been mentioned in detail above, since the tape cassette 1 of the invention is provided with the pair of cut-out portions 2c and 2d for receiving the tape pull-out pins, the pair of apertures 2e and 2f for entrance of the pinch roller and the pair of cut-out portions 2g and 2h on the right and left sides of the central line 0 thereof symmetrically in each of the pairs, said cassette 1 may be turned upside down, that is, in subsequence to the first run, can be used again in the upside down loaded condition with the lower panel of the housing 2b lying upside. In this case, the tape pull-out pins 21a–21b and 22a–22b enter the cut-out portions 2d and 2c respectively, and the capstan 23 enters the cut-out portion 2h. And, the pinch roller 24 enters through the aperture 2f. Thus, the resultant position of the cassette 1 relative to the VTR entirely resembles that of FIG. 3. Therefore, the second track which now lies in the upper half of the width of the tape 9 is made usable in recording or reproducing the video signal along with the audio signal and control signal.

Figure 4:
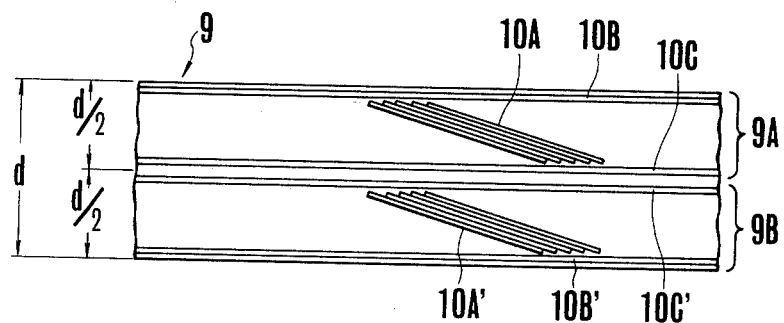
FIG. 4 is a schematic top view showing signal recording patterns on the tape.

FIG. 4 schematically shows the thus-recorded tracks of the various signals on the tape 9, where the video signal tracks 10A and 10A', audio signal tracks 10B and 10B', and control signal tracks 10C and 10C' are formed in the respective upper and lower strip portions 9A and 9B of half width d/2 of the tape 9.

It will be understood from the foregoing explanation that according to the present invention, even in striving for the same level of capacity of recording the video signal as in the prior art, a far lesser amount of tape as compared with the conventional cassette is required to be accommodated therein, thereby giving an advantage that the size of the tape cassette can be further reduced. Conversely when striving for the same amount of tape accommodated as in the prior art, and therefore the use of a tape cassette of the same size as in the prior art, the video signal recording capacity can be increased to a far greater extent as compared with the conventional one. Thus great advantages can be produced particularly in the cassette type video system.

Figure 5A:
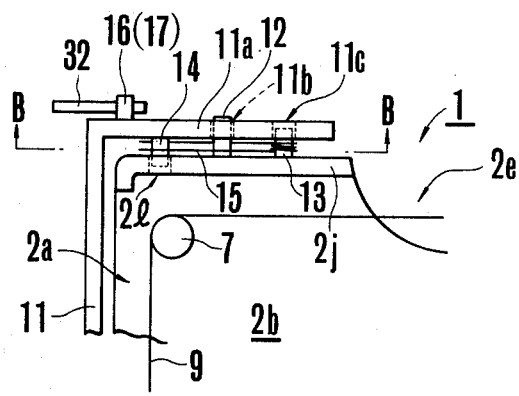
FIGS. 5A and 5B are schematic views showing an example of construction and arrangement of the main parts of a cover mechanism for a tape pull-out aperture provided in the tape cassette housing particularly with FIG. 5B being a sectional view taken along B—B line of FIG. 5A.
Figure 5B:
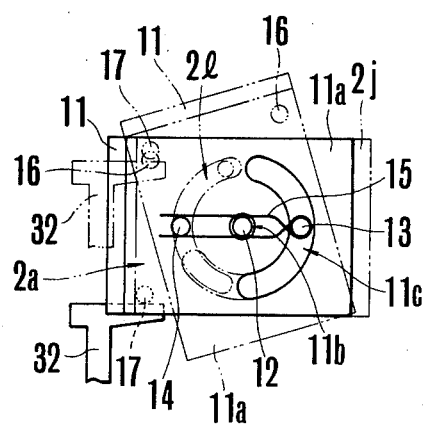

Finally, explanation is given to an example of a cover for the tape pull-out aperture 2a of the above-described cassette 1 by reference to FIGS. 5A and 5B. Though only one constructive portion is shown in FIGS. 5A and 5B as positioned in the right hand upper corner of the cassette 1 (namely, the upper edge 2j of the right panel of the housing) shown in FIGS. 1 and 2, as a matter of course, there is also provided same constructive portion in the left hand upper corner of the cassette 1 (namely, the upper edge 2k of the left panel of the housing 2).

In the figures, a cover plate 11 of area large enough to close the above-described aperture 2a for the tape pull-out formed in the front panel of the cassette housing 2 has a broad-eared portion 11a and is pivotally mounted at a hole 11b provided through the wall of the ear portion 11a on a pin 12 which is planted on the upper end portion of the right panel 2j of the cassette housing 2. Also planted on the above-described housing panel 2j is another pin 13 side by side with the above-described pivot pin 12, extending into a semi-circular slot 11c (see FIG. 5B) formed in the above-described ear portion 11a of the cover plate 11. A spring loaded pin 14 is planted on the ear portion 11a of the cover plate 11 at the opposite position to that of the above-described pivot pin 12 and extends into a semi-circular slot 2l (see FIG. 5B) formed in the above-described housing plate 2j. A spring member 15 is constructed in the form of a hairpin spring whose bottom is trained around the pin 13 and whose two extending arms lie on the opposite side of the above-described pins 12 and 14 so that the above-described cover 11 is urged to take the neutral position illustrated by the solid line in FIG. 5B, that is, to close the aperture 2a for the tape pull-out of the cassette 1.

The cover mechanism of such construction permits the cover plate 11 to be moved in either a clockwise or a counterclockwise direction so that when the cassette 1 is loaded in the chamber within the VTR apparatus, as the above-mentioned cassette carrier (not shown) moves downwards, the opening of the aperture 2a is effected by a fixed control member 32 provided in the VTR apparatus in engagement with either of two pins 16 and 17 planted on the ear portion 11a of the cover plate 11 depending upon whether the cassette loading position is normal or upside down, as the cover plate 11 is turned about the pin 12 against the force of the spring member 15. Thus, when the cassette loading has been completed, the cover plate 11 is moved away from the front of the aperture 2a.

What is claimed is:

1. A tape cassette containing therein a video recording tape and adapted for use with a video recording apparatus which comprises cylindrical means for guiding a portion of the tape at the outside of said cassette for video recording, rotatable recording means disposed within said cylindrical means for recording video signals on a portion of the tape surrounded on the cylindrical means and movable tape loading means for extracting a portion of the tape from said cassette and for bringing the extracted portion of the tape into contact around said cylindrical means, said tape cassette comprising:

(a) a housing for containing the tape therein, said housing having an upper wall and a bottom wall opposed to each other, and a front wall, wherein said front wall is provided with an aperture for tape extraction to allow for extraction of a portion of the tape from said housing by said tape loading means in said video recording apparatus, and said upper and bottom walls are provided with cutouts contiguous to said aperture for allowing free entrance of said tape loading means into said housing even when said cassette is in upside down condition;

(b) a pair of rotatable reel means disposed in substantially juxtaposed relation with each other within said housing for supporting the tape; and (c) a plurality of guide means disposed within said housing to guide a portion of the tape so as to assume a position along said tape extraction aperture of the front wall within said housing;

wherein said cutouts of said upper and bottom walls for entrance of said tape loading means are formed to allow for entrance of said tape loading means in said video recording apparatus in the rear of a portion of the tape positioned along said tape extraction aperture of the front wall even when the cassette is in upside down condition; and said video recording apparatus further comprising:

driving means arranged for driving the tape within the housing of said cassette and movable pressure means for pressing the tape to said driving means for the tape driving;

wherein said housing of the tape cassette further has a pair of side walls opposed to each other, in which said side walls are provided with pressure means entrance apertures for allowing entrance of a portion of said pressure means into the interior of the housing even when the cassette is in upside down condition, and wherein said upper and bottom walls are provided with cutouts for allowing entrance of said driving means arranged so that even when the cassette is in upside down condition, said driving means being allowed to freely enter the interior of the housing at the rear of a portion of the tape which is positioned along said pressure means entrance aperture.

2. A tape cassette according to claim 1, wherein said pair of reel means are disposed in at least partially overlapped relation to each other.

3. A video recording system comprising, in combination:

a tape cassette containing therein a video recording tape and a video recording apparatus which comprises cylindrical means for guiding a portion of the tape at the outside of said cassette for video recording, rotatable recording means disposed within said cylindrical means for recording video signals on a portion of the tape surrounded on the cylindrical means and movable tape loading means for extracting a portion of the tape from said cassette and for bringing the extracted portion of the tape into contact around said cylindrical means, said tape cassette comprising:

(a) a housing for containing the tape therein, said housing having an upper wall and a bottom wall opposed to each other, and a front wall, wherein said front wall is provided with an aperture for tape extraction to allow for extraction of a portion of the tape from said housing by said tape loading means in said video recording apparatus, and said upper and bottom walls are provided with cutouts contiguous to said aperture for allowing free entrance of said tape loading means into said housing even when said cassette is in upside down condition;

(b) a pair of rotatable reel means disposed within said housing for supporting the tape; and (c) a plurality of guide means disposed within said housing to guide a portion of the tape so as to assume a position along said tape extraction aperture of the front wall within said housing;

said recording means being arranged to record the video signals only on a tape portion of almost one-half width of said portion of the tape surrounded on the cylindrical means;

wherein said cutouts of said upper and bottom walls for entrance of said tape loading means are formed to allow for entrance of said tape loading means in said video recording apparatus in the rear of a portion of the tape positioned along said tape extraction aperture of the front wall even when the cassette is in upside down condition; and said video recording apparatus further comprising:

driving means arranged for driving the tape within the housing of said cassette and movable pressure means for pressing the tape to said driving means for the tape driving;

wherein said housing of the tape cassette further has a pair of side walls opposed to each other, in which said side walls are provided with pressure means entrance apertures for allowing entrance of a portion of said pressure means into the interior of the housing even when the cassette is in upside down condition, and wherein said upper and bottom walls are provided with cutouts for allowing entrance of said driving means arranged so that even when the cassette is in upside down condition, said driving means being allowed to freely enter the interior of the housing at the rear of a portion of the tape which is positioned along said pressure means entrance aperture.

4. A video recording system comprising, in combination:

a tape cassette containing therein a video recording tape and adapted for use with a video recording apparatus which comprises cylindrical means for guiding a portion of the tape at the outside of said cassette for video recording, rotatable recording means disposed within said cylindrical means for recording video signals on a portion of the tape surrounded on the cylindrical means and movable tape loading means for extracting a portion of the tape from said cassette and for bringing the extracted portion of the tape into contact around said cylindrical means, said tape cassette comprising:

(a) a housing for containing the tape therein, said housing having an upper wall and a bottom wall opposed to each other, and a front wall, wherein said front wall is provided with an aperture for tape extraction to allow for extraction of a portion of the tape from said housing by said tape loading means in said video recording apparatus, and said upper and bottom walls are provided with cutouts contiguous to said aperture for allowing free entrance of said tape loading means into said housing even when said cassette is in upside down condition;

(b) a pair of rotatable reel means disposed within said housing for supporting the tape; and (c) a plurality of guide means disposed within said housing to guide a portion of the tape so as to assume a position along said tape extraction aperture of the front wall within said housing;

said cylindrical means being arranged to guide a portion of the tape outside said cassette in relatively oblique manner for video recording;

said recording means being arranged to record video signals only on a tape portion of almost one-half width of said portion of the tape surrounded on the cylindrical means along a relatively oblique scanning trace;

wherein said cutouts of said upper and bottom walls for entrance of said tape loading means are formed to allow for entrance of said tape loading means in said video recording apparatus in the rear of a portion of the tape positioned along said tape extraction aperture of the front wall even when the cassette is in upside down condition; and said recording apparatus further comprising:

driving means arranged for driving the tape within the housing of said cassette and movable pressure means for pressing the tape to said driving means for the tape driving;

wherein said housing of the tape cassette further has a pair of side walls opposed to each other, in which said side walls are provided with pressure means entrance apertures for allowing entrance of a portion of said pressure means into the interior of the housing even when the cassette is in upside down condition, and wherein said upper and bottom walls are provided with cutouts for allowing entrance of said driving means arranged so that even when the cassette is in upside down condition, said driving means being allowed to freely enter the interior of the housing at the rear of a portion of the tape which is positioned along said pressure means entrance aperture.

5. A system according to claim 4, wherein said recording means comprises a pair of recording heads arranged to alternately record video signals only on a tape portion of almost one-half width of said portion of the tape surrounded on said cylindrical means along a relatively oblique scanning trace.

6. A system according to claim 5, further comprising means for recording audio signals and control signals on the tape, said recording means being arranged to record the audio signals and control signals, respectively, on upper and lower marginal portions of a tape portion of almost one-half width of the tape.

7. A tape cassette according to claims 1 or 2, wherein said video recording apparatus further comprises means engageable with a portion of said cassette, said tape cassette further comprising:

upwardly and downwardly movable cover means provided to shut up said tape extraction aperture of the front wall, said cover being arranged to be moved away from the aperture by the engagement of said engageable means upon loading of the tape cassette in the video recording apparatus.

8. A video recording system comprising, in combination:

a tape cassette according to any one of claims 3 to 6, wherein said video recording apparatus further comprises means engageable with a portion of said cassette, said tape cassette further comprising:

upwardly and downwardly movable cover means provided to shut up said tape extraction aperture of the front wall, said cover being arranged to be moved away from the aperture by the engagement of said engageable means upon loading of the tape cassette in the video recording apparatus.

* * * * *